United States Patent Office 3,463,622
Patented Aug. 26, 1969

3,463,622
FUEL OILS
Hugh Frederick Stevens, The Lodge, South Wonston, Winchester, Hampshire, England, and Tom Craven, Hillcross, Droxford Road, Swanmore, Hampshire, England
No Drawing. Filed Dec. 30, 1965, Ser. No. 517,831
Int. Cl. C10l 1/12, 1/32
U.S. Cl. 44—51    7 Claims

ABSTRACT OF THE DISCLOSURE

High sulphur content fuel oils can be improved by incorporating a lead oxide or alkali plumbite dispersed in tall oil and triethanolamine.

---

This invention relates to fuel oils and especially to heavy fuel oils of high sulphur content, that is, to oils containing around 3–5% by weight of sulphur.

On combustion of the oil, the sulphur is converted initially to sulphur dioxide ($SO_2$) and then, if sufficient excess air is present, to sulphur trioxide ($SO_3$), these oxides being the anhydrides of sulphurous ($H_2SO_3$) and sulphuric ($H_2SO_4$) acid respectively. However, the subsequent conversion of the initial sulphur dioxide to sulphur trioxide is very undesirable, since it is accompanied by a rise in the acid dew point of the combustion gases; this results in the furnace or boiler not being able to run as efficiently as required because the relatively low exit gas temperature present with normal efficient burning may drop below the acid dew point, causing in turn the formation of sulphuric acid which has a corrosive effect on metal flues. Thus it is known in the art that a sulphur trioxide content of more than 4–5 p.p.m. is enough to give rise to anxiety, and that a content of 10 p.p.m. will give a dew point of around 270° F. whilst with 50 p.p.m. the dew point is increased to around 330° F.

It is known that the conversion of sulphur dioxide to sulphur trioxide can be controlled to a large extent by critical adjustment of the starting air/fuel ratio. Also other devices like reduction in diameter of the top of the stack and aluminium linings have been tried; metal oxides have also been blown into the combustion chamber or the bottom of the stack. However, all these expedients are relatively costly, since they involve constructional alteration or careful manipulation of the furnace equipment.

The present invention, on the other hand, avoids these difficulties by simply controlling in advance the composition of the fuel. To this end, the present invention provides a sulphur-containing fuel oil containing as additive dispersed through the oil a lead oxide moiety.

It is of course known that fuel oils are of hydrocarbon nature and accordingly that lead oxides, as opposed to lead organometallic compounds, will in general be insoluble therein.

It is also known that there are a considerable number of lead oxides; in addition to the stoichiometric compounds PbO and $PbO_2$ corresponding to the divalent and quadrivalent states of lead respectively, red lead ($Pb_3O_4$) and lead sesquioxide ($Pb_2O_3$) are recognized compounds and may be regarded as $Pb_2^{II}(Pb^{IV}O_4)$ and $Pb^{II}Pb^{IV}O_3$—viz pages 523–9, Partington "General and Inorganic Chemistry" published by Macmillan in 1949. More complex oxides, e.g. $Pb_5O_8$, $Pb_2O$ are also known (viz Partington, supra) and hence a lead oxide, in its most general form, can be regarded as having a formula $PbO_x$ where $x$ represents some fraction or integer greater than 0 but not more than 2. The range of intermediate oxides may in general be prepared by appropriate heat and/or chemical treatment of the stoichiometric oxides PbO and $PbO_2$ (viz Partington, supra); the intermediate oxides will in general lack any distinctive crystalline structure and may conveniently be pictured, if desired, as being constituted of appropriate proportions of Pb, PbO and $PbO_2$.

In order to maintain the lead oxide, which is the effective sulphur dioxide conversion antagonist uniformly distributed throughout the oil, and avoid precipitation, it may be preferred to convert the lead oxide per se into a derivative which is more easily dispersible but in which the lead oxide moiety is retained. It is well-known, for example, that PbO can be converted into sodium plumbite, $Na_2PbO_3$, which may be regarded as $2Na^+ + PbO_3^=$—viz Partington, supra.

The term lead oxide moiety is accordingly used in the present specification and claims to mean both a lead oxide per se and a derivative of that oxide retaining the lead-oxygen linkage. Compounds such as lead halides, which might otherwise be considered as "derivatives" of lead oxides, are hence excluded as are of course lead organometallic compounds.

The preferred lead oxide is that known as litharge (PbO), and it is preferred to employ this in the form of a dispersion of sodium plumbite. The material added to the fuel oil is thus constituted of an emulsion of sodium plumbite in the dispersion medium.

One particular example of an emulsion of this type comprises an emulsion of sodium plumbite, containing tall oil and/or triethanolamine as emulsifying agents, and a mixture of high molecular weight aromatic hydrocarbons as dispersion medium. This example of emulsion may be made up from the following ingredients (the percentages are by weight).

(1) Hydrocarbon solvent (over 75% aromatics) __ 69
(2) Tall oil (low resin acid content) _____ 16.5
(3) Triethanolamine (technical grade max. water content 1%) _____ 9.6
(4) (a) Litharge _____ 0.3
    (b) NaOH "Liquor" (22% active caustic soda content) _____ 4.5
    (c) Ammonia _____ 0.1

100.0

The method of manufacture is as follows:

(i) A sodium plumbite solution is first of all made by dissolving litharge, ingredient 4(a), in the boiling NaOH solution of 22% active NaOH content, ingredient 4(b), using a little sugar as "synergist" for the dissolution.

(ii) Put ingredient 1 in vat; start mixer; add ingredient 2; then ingredient 3; then slowly add ingredients 4(a) and (b) finally "clear" with ingredient 4(c).

The present invention thus provides a method of preparing an additive for a sulphur-containing fuel oil comprising dissolving litharge in hot alkali, slowly adding the resulting solution to a mixture of emulsifying agent and aromatic solvent with simultaneous agitation and then clearing the final mixture with ammonia.

Numerous other formulations are of course within the scope of the present invention. Thus, in the example given above, the percentage of triethanolamine can be both reduced below 9.6, down to around 8.8, and also increased above 9.6 although with too much the emulsion tends to become sticky. Again, the nature and quantity of the alkali can vary according to the lead oxide used and so can the aromatics percentage in the solvent. However, these possibilities will all be clear to those skilled in the art.

The emulsion is conveniently added to the fuel oil in the storage tank in order to permit uniform dissemination of the emulsion throughout the oil prior to combustion. As regards quantities, the proportion of emulsion necessary is relatively extremely small, although varying to a degree according to the nature of the oil.

Thus for the composition described above, with light to heavy grades of fuel oil the proportion of emulsion to be added is around 0.025%, or up to 0.05% if the tank is badly sludged; with diesel fuels, the proportion may be around 0.0125%–0.01875% or, if the water content in the tank is above 4%, double these amounts; all the amounts quoted are for proportions by volume.

On a weight basis, the proportion of lead oxide in the eventual fuel oil for the composition described above may be up to 0.00015%, with a preferable minimum of 0.0000375%. Generally, it will be found unnecessary to increase the lead oxide moiety content (calculated at PbO), to above .0005% by weight.

Although the mechanism whereby the lead oxide functions is not fully appreciated, experimental tests have shown that it is capable of inhibiting the further conversion of the sulphur dioxide to trioxide to an extent of around 30%–40%, which represents a substantial advantage in practice. It may be hypothesized, however, that in the presence of the lead oxide moiety, the normal sulphur dioxides conversion reaction:

$$SO_2 + \tfrac{1}{2} O_2 \rightarrow SO_3$$

is replaced to a considerable extent by the following:

$$-Pb-O- + SO_2 + \tfrac{1}{2} O_2 \rightarrow PbSO_4$$

Other advantages achieved are superior atomisation of the oil, no clogging of screens, valves and piping, no cleaning out of badly sludged tanks, and easier maintenance of burner tips.

The present invention also includes, as a new composition, a dispersion of sodium plumbite in a high molecular weight aromatic hydrocarbon.

We claim:

1. A sulphur-containing fuel oil containing a lead compound selected from the group consisting of a lead oxide and an alkaline plumbite, in an amount from about 0.00004 to about 0.0005 percent by weight calculated as PbO, tall oil and triethanolamine.

2. A fuel oil according to claim 1 wherein the lead compound is litharge.

3. A fuel oil according to claim 1 wherein the lead compound is sodium plumbite.

4. A fuel oil according to claim 1 containing about 2 parts by weight of tall oil for each part by weight of triethanolamine.

5. A fuel oil additive comprising a lead compound selected from the group consisting of a lead oxide and an alkali plumbite, tall oil and triethanolamine.

6. An additive according to claim 5 wherein the lead compound is litharge.

7. An additive according to claim 5 wherein the lead compound is sodium plumbite.

References Cited

UNITED STATES PATENTS

| | | | |
|---|---|---|---|
| 1,601,215 | 9/1926 | Johansen | 208—199 |
| 1,601,216 | 9/1926 | Johansen | 208—199 |
| 2,671,758 | 3/1954 | Vinograd et al. | 252—25 |

DANIEL E. WYMAN, Primary Examiner

YVONNE H. SMITH, Assistant Examiner